2,748,027

SIZING OF VINYLIDENE CHLORIDE COPOLYMER SURFACES

John Warren Meier, Madison, Tenn., assignor to E. I. du Pont de Nemours and Company, Wilmington, Del., a corporation of Delaware No Drawing. Application May 29, 1953, Serial No. 358,547

2 Claims. (Cl. 117—76)

This invention relates to sizing polymeric surfaces and, more particularly, to the sizing of surfaces of vinylidene chloride copolymer to enhance the slip and to diminish the matting tendencies thereof.

Vinylidene chloride copolymer films, whether self-supporting or in the form of coatings, are tough, flexible, strong, odorless, transparent, heat-sealable and inherently moistureproof and, hence, are potentially valuable protective films. However, such films, especially when employed as coatings on smooth base materials such as sheets or films or regenerated cellulose, cellulose acetate, polyethylene terephthalate, etc., have two serious disadvantages, viz.: (1) the coated sheets or film tend to have strong blocking or matting characteristics; i. e., when superimposed sheets or film are pressed together (as in stacking for storage), the contacting surfaces strongly adhere to one another; and (2) the coated sheets or film have poor slip. "Slip" may be defined as a measure of the ease with which two contacting surfaces of a film slide past each other when held together under constant pressure while being subjected to a shearing action. These disadvantages are of particular concern when the coated film is to be used in automatic packaging and wrapping machines.

It is common practice to overcome matting and slip deficiencies by dusting film surfaces with particles of a dry material, such as talcum powder, or by treating with a liquid which will deposit solid foreign particles on the film, cf.:

U. S. 2,008,815 (Brandenberger et al.)
U. S. 2,095,129 (Drew)
U. S. 2,167,105 (Drew)
U. S. 2,206,046 (Pollard)
U. S. 2,251,752 (Mitchell)

In either case, the treated film is covered with minute particles of solid materials which, in effect, roughen the surface and prevent intimate contact between film surfaces or between the film and some other surface, such as occurs in bag making, packaging and wrapping machines. It is also possible to reduce matting and improve slip, in some cases, by the incorporation of particles of solid materials in the coating compositions. While these prior art expedients have proven generally satisfactory in the treatment of uncoated film and film coated with wax-containing moistureproofing compositions heretofore employed, difficulties have been encountered in all instances where such known treatments have been used on vinylidene chloride polymer and like polymer coatings. Dusting vinylidene chloride polymer-coated film with powdered materials, for example, is likely to cause objectionable surface haze and the loosely-attached particles may be rubbed off, leaving the film more or less in its original condition. When dusted film is printed on continuous printing machines, the dust particles also tend to adhere to the transfer and printing rolls from which they may become dislodged in flake form, causing unprinted spots in the film. Liquid sizing treatments frequently leave objectionable hazy streaks and patterns on the film.

An object of this invention, therefore, is to provide vinylidene chloride copolymer surfaces having satisfactory slip characteristics and little, if any, tendency to blocking. Another object is to enhance slip characteristics and inhibit blocking tendencies of vinylidene chloride copolymer film surfaces without adversely affecting other and desirable properties of the film such as clarity, heat-seal bond strength, moisture permeability, etc. These and other objects will more clearly appear hereinafter.

The foregoing objects are realized by the present invention which, briefly stated, comprises spraying the vinylidene chloride copolymer surface with a dilute aqueous dispersion of vinylidene chloride copolymer particles chemically identical to or chemically similar to the vinylidene chloride copolymer surface, and thereafter drying the spray-sized surface.

Because of its commercial availability and importance, regenerated cellulose film constitutes a preferred base material for coatings, and the invention will hereinafter be described with specific reference to this base. Other suitable base materials are paper; films formed from polyethylene, polyethylene terephthalate, polyvinyl alcohol, lowly etherified or esterified cellulose, casein, various polyamides such as polyhexamethylene adipamide, polyhexamethylene sebacamide, polycaproamide and other types described in U. S. Patents Nos. 2,071,250 and 2,071,253; films from various cellulose esters such as cellulose acetate, cellulose nitrate and cellulose acetate-butyrate, etc.

As representative examples from the class of vinylidene chloride copolymers useful for coating these base materials and for forming self-supporting film, and useful also as the surface modifying agent of this invention, there may be mentioned: copolymers of vinylidene chloride/acrylonitrile, vinylidene chloride/methacrylonitrile, vinylidene chloride/methyl acrylate, vinylidene chloride/ethyl acrylate, vinylidene chloride/butyl acrylate, vinylidene chloride/isobutyl acrylate, vinylidene chloride/methyl methacrylate, vinylidene chloride/ethyl methacrylate, vinylidene chloride/butyl methacrylate, vinylidene chloride/isobutyl methacrylate, vinylidene chloride/methyl vinyl ketone, vinylidene chloride/vinyl chloride, vinylidene chloride/vinyl acetate, vinylidene chloride/styrene, vinylidene chloride/dichlorovinylidene fluoride, vinylidene chloride/chloroprene, vinylidene chloride/butadiene, and vinylidene chloride/methoxymethoxyethyl methacrylate. Itaconic acid may be copolymerized with each of the above to give 3 component systems. Also useful are copolymers of vinylidene chloride/dimethyl itaconate, vinylidene chloride/diethyl itaconate, vinylidene chloride/dibutyl itaconate, vinylidene chloride/vinyl pyridine, and vinylidene chloride/isoprene. Generally, the copolymer should contain not less than 75% of vinylidene chloride.

When the vinylidene chloride copolymers are used as coatings, they may be applied from solvent solution as disclosed, for example, in Hauser U. S. P. 2,462,185, or they may be coated from an aqueous dispersion as shown in Pitzl U. S. Patents Nos. 2,541,167 and 2,570,478.

Preferably, the copolymer particles of the spray dispersion and the copolymer of the surface to be treated should be chemically identical. However, chemical identity of the two copolymers, though preferred, is not an essential feature of the invention. It is only requisite that the copolymer particles and the copolymer of the surface be chemically similar with respect, at least, to their major chemical components so that the two will have substantially the same refractive indices and will satisfactorily adhere together. "Chemically similar" as used herein means that the major monomer constituent of the copolymer of the surface to be treated, and the major constituent of the copolymer particles to be sprayed on said surface should be the same in kind and substantially the same in proportion. For example, in spraying a surface of the preferred copolymer containing at least 75% vinylidene chloride, the copolymer of the particles of the spray dispersion should also contain at least 75% vinylidene chloride. If these specifications are not observed, the treated surface will be objectionably hazy and/or the copolymer particles will not adhere satisfactorily after the sprayed surface is dried.

For satisfactory spray application, the dispersion should contain from 0.5% up to 20% by weight of copolymer with an optimum range of 2–5%. The size of the particles in the dispersion to be sprayed should be kept below 75 microns for best results, although it is not too critical. The size of the particles as they appear on the base film is more critical. This is governed by the fineness of the spray delivered by the spray guns. The applied particle on the film surface consists of a large number of dispersion polymer particles, coalesced into a larger particle or "bump" which is tightly adhered to the coating. Microscopic examination of spray-sized film indicates an average particle or "bump" diameter of 25 microns with a range of 10 to 50 microns. The amount of solids sprayed on the polymer surfaces should not be over 0.1 gram per square meter per side, since the film appearance becomes objectionably hazy above that amount; and it should not be less than 0.025 gram per square meter per side since matting and slip become unsatisfactory below that amount.

Film which has been spray sized in this manner consists of a cellulose sheet (e. g., 0.0013" thick) coated on both sides with a smooth layer of vinylidene chloride copolymer (e. g., 2 microns on each surface) upon both outer surfaces of which are microscopic bumps of the polymer sizing material. These bumps are the result of the spray size operation, each bump, being the result of the impingement on the film of a particle of spray followed by drying and coalescence of the dispersed polymer into a particle which is homogeneous with the coating. The bumps do not constitute a continuous coating of polymer atop the first coating but are individual particles which do not in general overlap.

The following specific examples further illustrate the principles and practice of this invention. Parts and percentages are by weight unless otherwise indicated.

EXAMPLE 1

An aqueous dispersion of a copolymer of vinylidene chloride, methyl acrylate and itaconic acid was prepared according to the following formula:

| | |
|---|---|
| Water | 100.8 parts. |
| 30% water solution of "Duponol" WAQ [1] | 6.67 parts. |
| Itaconic acid | 2. parts. |
| Methyl acrylate | 6. parts. |
| Vinylidene chloride | 94. parts. |
| Ammonium persulfate | 0.2 part dissolved in 1 part water. |
| Meta sodium bisulfite | 0.1 part dissolved in 1 part water. |

[1] Sodium salts of sulfated straight-chain alcohols ranging from $C_{10}$ to $C_{18}$.

The dispersion was prepared by placing these ingredients in the order indicated in a round-bottom vessel. The mixture was refluxed with agitation for two hours at 33–34° C. 13.33 parts of "Duponol" WAQ solution 2.6 parts of 30% hydrogen peroxide were added after reflux had ceased. This dispersion contained approximately 46% solids.

Regenerated cellulose film approximately 0.0013" thick was coated with a thin layer of the above dispersion at room temperature—approximately 4 microns thick on each surface and then dried, leaving a dry coating of approximately 1–2 microns thick on each surface. The dried coated film was then evaluated for slip, matting, and heat-seal bond strength. Slip and matting, shown in the table 1, were both poor. Appearance and heat-seal bond strength were good.

*Slip.*—Slip is defined as the resistance or nonresistance of film to shearing action. Film having poor slip is difficult to handle in the wrapping machines used in the packaging industry. It is determined by folding the sheet and applying maximum, uniform squeezing pressure on the folded sheet between the thumb and forefinger and immediately, without releasing the pressure, following this with a slow shearing movement of the thumb and forefinger.

The three gradings for slip are defined as follows:

1. The surface slides smoothly over itself. Slip is excellent.
2. The surfaces slide jerkily over themselves, i. e., slip interruptedly, tend to jump or catch (usually at the beginning of the shearing movement). Slip is fair.
3. The surface does not slide over itself and the thumb and forefinger tend to slip first. Slip is poor.

*Matting.*—Matting is defined as the tendency of a film to adhere when two or more surfaces are pressed together.

A.—Preparation of samples

A stack consisting of 30 to 32 3½" x 4" sheets of film, piled back to front throughout the stack is placed on a 3½" x 4" sheet of chipboard and covered with a similar square of chipboard. The assembly is placed on a smooth sheet of metal at least 1/16" thick and approximately 6" square. A lead weight with a smooth face (3½" x 4") weighing a total of 4.6 lbs. (⅓ lb. per sq. in.) is accurately placed on top of the stack, and the entire assembly is placed in an oven maintained at 45° C. with care exercised to prevent disturbing the uniform alignment of the sheets. For convenience in handling, the weight should have an inverted U handle which can be made from ¼" metal rod. Several stacks of sheets, prepared as described above, can be piled together under one weight. The weighted sheets are held in the 45° oven for 24 hours, though no appreciable differences in matting result from retaining them in the over for considerably longer periods such as three or more days. The stacks are then carefully removed from the oven and allowed to cool to room temperature (30 minutes or more) after which they are graded.

B.—Grading

After removal of the chipboard, the stack of film sheets is grasped by thumb and forefinger in the center of the stack. A shearing force is then applied with care taken to avoid bending the stack or disturbing its edges. Results are graded as follows:

Grade 1—The sheets slide apart individually with no tendency whatever to cling together.

Grade 1+—The sheets slide apart individually but with perceptible cling.

Grade 2—The stack separates into two or more groups of sheets which remain moderately firmly matted together.

Grade 2+—The stack separates on application of maximum force into two or more groups of sheets which are firmly matted together.

Grade 3—The stack cannot be separated by straight shearing force.

Note.—Easy separation of the top and bottom sheets in 2, 2½ and 3 gradings should be disregarded.

*Heat-seal bond strength.*—Heat-seal bond strength is a measure of the strength of the bond between two films when they are sealed together by heat and pressure. For the purpose of comparison and definition, the following test is used to measure the strength of the heat-seal bond.

A piece of the coated film 4" x 10" with the grain running in the long direction is cut into two pieces 4" x 5", handling all pieces by the corners so as not to contact the areas to be sealed. The two pieces 4" x 5" are superimposed one on the other so that opposite surfaces are in contact. The two pieces of superimposed film are then sealed together at each end, at right angles to the grain, with a sealing bar ¾" wide heated to 145° C., at 20 p. s. i. pressure and 2 seconds contact time. The sealed sheets are then cut in half at right angles to the grain, and each half is cut into 1½" wide strips, parallel to the grain, from the center of the sheets, resulting in four sets to be tested. Each set of the 1½" wide sealed strips is opened at the free ends, placed in a Suter testing machine and pulled apart. The force in grams required to pull the strips apart is taken as a measure of the heat-seal bond strength.

EXAMPLE 2

Regenerated cellulose film approximately 0.0013" thick was coated with the dispersion of Example 1 as in Example 1, dried, and was then passed through a spray of an aqueous dispersion made by diluting some of the dispersion of Example 1 down to 1% polymer content. The residual heat from the original drying step was sufficient to dry the sprayed film. The sprayed particles adhered tenaciously to the coated film and, as shown in Table I, gave a matting rating of 1+, a slip rating of 2, good appearance, and no degradation of heat-seal bond strength.

EXAMPLE 3

Regenerated cellulose film approximately 0.0013" thick was coated with the same dispersion and in the same manner as in Example 2, dried, and was then sprayed with some of the dispersion of Example 1 diluted to 3% polymer content. As shown in the table 1, matting, slip, appearance and heat-seal bond strength were all good.

EXAMPLE 4

The dispersion of Example 1 was diluted to 7% polymer content and then sprayed on the coated film of Example 1. Matting, slip, appearance and heat-seal bond strength were all good, as is set forth in the table 1.

EXAMPLE 5

Regenerated cellulose film approximately 0.0013" thick was coated with a solvent solution of a 90/10 vinylidene chloride/acrylonitrile copolymer according to the teachings of Hauser in U. S. Patent 2,462,185. The matting and slip were poor. The appearance and heat-seal were good. See the table 1.

EXAMPLE 6

The coated film of Example 5 was sprayed with a 3% dispersion of Example 1. The resulting film had satisfactory matting, slip, appearance and heat-seal bond strength. See the table 1.

Example 7

Polyethylene terephthalate film 0.0005" thick was coated with 14 grams per square meter (7 grams on each surface) of a vinylidene chloride copolymer made by polymerizing together 90 parts of vinylidene chloride 10 parts of ethyl acrylate and 1 part of itaconic acid. The coated film, as shown in the table, had poor matting, poor slip and good heat-seal.

Example 8

The coated film of Example 7 was sprayed with a 3% solids dispersion of a vinylidene chloride copolymer made by polymerizing together 94 parts of vinylidene chloride, 6 parts of methyl acrylate and 2 parts of itaconic acid. Matting resistance and slip of the sized film were both good. Heat-seal bond strength was not adversely affected.

TABLE I

| Example | Percent Polymer in Dispersion | Matting, 1 day at 45° C. | Slip | Appearance [1] | Heat-Seal Bond Strength | |
|---|---|---|---|---|---|---|
| | | | | | 35% R. H. | 81% R. H. |
| 1 | 0 | 3 | 3 | Clear | 310 | 170 |
| 2 | 1 | 1+ | 2 | 1 | 305 | 165 |
| 3 | 3 | 1-1+ | 1 | 1+ | 315 | 175 |
| 4 | 7 | 1 | 1 | 1+ | 310 | 175 |
| 5 | 0 | 3 | 3 | 1 | 400 | 150 |
| 6 | 3 | 1 | 1 | 1+ | 400 | 150 |
| 7 | 0 | 2+-3 | 3 | 1+ | 685 | 600 |
| 8 | 3 | 1+ | 1 | 1+ | 670 | 590 |

[1] Appearance gradings are: (1) clear film to scarcely visible size haze; (2) visible but acceptable haze; (3) borderline haze; (4) excessive haze—unacceptable.

From the foregoing, it is apparent that this invention has made it possible to treat smooth polymer surfaces having poor slip and poor matting characteristics so as to give good slip and good anti-matting merely by spraying the surfaces with a dilute aqueous dispersion of a polymer chemically identical with or similar to the polymer.

I claim:

1. A process for improving the surface characteristics of regenerated cellulose film coated with a protective coating of a copolymer of vinylidene chloride and at least one ethylenically unsaturated monomer polymerizable with vinylidene chloride, said copolymer containing not less than 75% vinylidene chloride which consists in spraying said coated film with an aqueous dispersion containing from 0.5% to 20% by weight, based on the total weight of dispersion, of particles of a copolymer of vinylidene chloride and at least one ethylenically unsaturated monomer polymerizable with vinylidene chloride said copolymer containing not less than 75% vinylidene chloride, and thereafter drying the resulting sprayed film, the amount of dispersion sprayed being sufficient to deposit from 0.025 to 0.1 gram of solids per square meter of film surface per side, the spray being of such fineness and drying being under such conditions as to form on the film deposited particles having an average particle diameter of 25 microns and a range of from 10 to 50 microns in diameter.

2. The process of claim 1 wherein the copolymer of said particles is chemically identical to the said copolymer of said coating.

References Cited in the file of this patent

UNITED STATES PATENTS

| 2,541,167 | Pitzl | Feb. 13, 1951 |
| 2,633,434 | Tanner | Mar. 31, 1953 |